G. P. COVAR.
COMBINED ROLLING PIN AND CULINARY HOLDER.
APPLICATION FILED MAY 13, 1918.
1,327,461.
Patented Jan. 6, 1920.
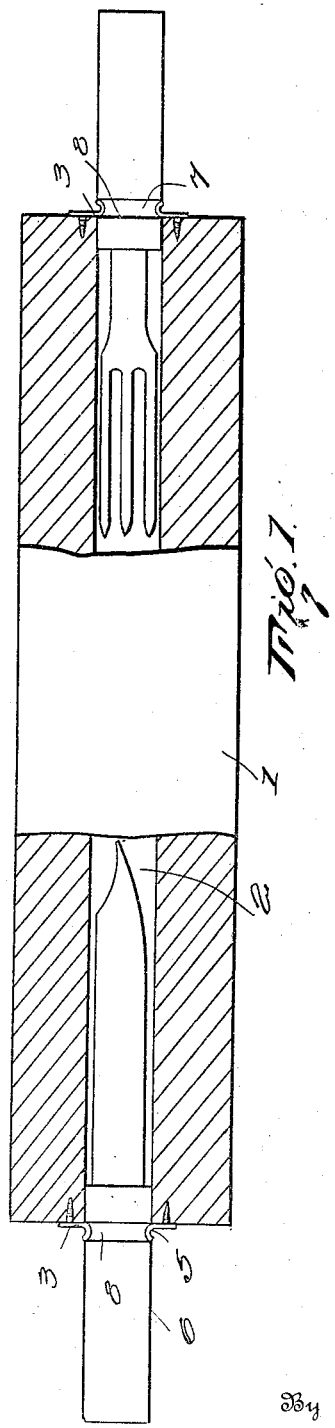
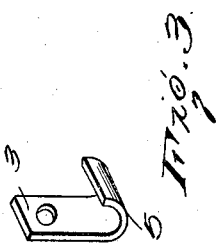
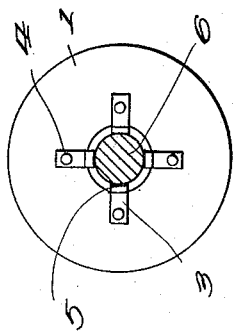
George P. Covar
Inventor
By Geo. P. Kimmel
Attorney

UNITED STATES PATENT OFFICE.

GEORGE P. COVAR, OF CHESTER, SOUTH CAROLINA.

COMBINED ROLLING-PIN AND CULINARY HOLDER.

1,327,461.  Specification of Letters Patent.  Patented Jan. 6, 1920.

Application filed May 13, 1918. Serial No. 234,285.

*To all whom it may concern:*

Be it known that I, GEORGE P. COVAR, a citizen of the United States, residing at Chester, in the county of Chester and State of South Carolina, have invented certain new and useful Improvements in Combined Rolling-Pins and Culinary Holders, of which the following is a specification.

This invention relates to new and useful improvements in a combination article, that is adapted to form a rolling pin and a culinary implement holder, and the device is adapted to so operate that when the culinary implements are positioned within the pin the handles of the same act as handles for the rolling pin. This device forms a very simple means for holding the culinary implements within the pin, and also permitting the pin to be used in the usual manner when the implements are so positioned.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the drawings:

Figure 1 is a longitudinal section through the implement showing the main portion thereof in elevation, Fig. 2 is an end view thereof with the implement shown in section, and Fig. 3 is a detail perspective view of one of the holding spring clips.

In describing my invention, I shall refer to the drawings in which similar reference characters designate corresponding parts throughout the several views.

The numeral 1 designates a rolling pin which is of the conventional shape, and which is provided with a hollow center or bore 2 that extends longitudinally the entire length of the same. Adapted to be secured to the opposite ends of the pin 1 are a plurality of spring clips 3, which have their main portions secured to the ends of the pin by rivets 4, or any other desired type of fastening means, and the spring clips have their outer ends bent upwardly as shown at 5 and disposed at the edges of the openings in the ends of the pin. These bent ends of the clips project beyond the edges of said openings for a purpose to be hereinafter more fully described.

Adapted to be positioned in the openings in the opposite ends of the pin are the culinary implements which are designated by the numerals 6 and 7, said implements preferably comprising a knife 6 and a fork 7, as clearly shown in the accompanying drawings, and having the handle portions thereof formed with grooves 8 extending around the same adjacent their inner ends, and the inner edges of the grooves 8 lying flush with the ends of the rolling pin. The culinary implements are adapted to be positioned within the pin, and when the grooved portions of the handles come into engagement with the clips the bent portions 5 thereof will engage within the same with their outer terminals substantially flush with the surface of the handles so that the implements will be securely held therein, and no projections will be exposed which might injure or scratch the hands of the operator in the event of sliding them down the handles as often takes place in operating a rolling pin.

In operation, when the culinary implements are positioned within the pin, as is clearly shown in Fig. 1 of the drawings, it is obvious that the spring clips being positioned within the grooves 8, will securely hold the implements in position, although they themselves will be substantially concealed within the grooves and out of the way, and the projecting portions of the handles thereof are adapted to form handles for the rolling pin so that the same may be used in the usual manner. It is obvious that the implements may be easily released from the pin by exerting sufficient pressure thereon so that they are withdrawn past the clips. A plurality of spring clips are positioned on the opposite ends of the pin, preferably four at each end, which are arranged in spaced relation around the openings in the ends.

This type of device will be found especially useful for campers, etc., as it forms a means for combining in a single device a rolling pin, and a culinary implement holder. Although the implements shown in the accompanying drawings comprise a knife and fork, it is obvious that any culinary implement that is formed with the suitable grooved handle may be adapted for use. The groove in the handles of the culinary implements will strenghten the holding means therefor, and likewise limit the inward movement of the implement.

From the forgoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim is new and desire to secure by Letters Patent, is:

A rolling pin having an axial bore throughout its entire length, handles removably engaged in the bore and provided with annular grooves, one of the edges of the grooves lying flush with the edges of the bore, a plurality of spring clips arranged on the ends of the rolling pin about the bore and disposed radially with respect thereto and the ends of the clips bent to approximate a semi-circle and extending within the grooves the termination thereof being coincident with the outer of the edges of the grooves to prevent accidental contact therewith by the hands of the operator.

In testimony whereof, I affix my signature hereto.

GEORGE P. COVAR.